United States Patent [19]

Blake et al.

[11] Patent Number: 5,145,320

[45] Date of Patent: Sep. 8, 1992

[54] MASS LOADED COMPOSITE ROTOR FOR VIBRO-ACOUSTIC APPLICATION

[75] Inventors: William K. Blake, Bethesda; Aleksander B. Macander, Rockville; Jonathan Gershfeld, Kensington, all of Md.

[73] Assignee: The United States of America as represented by the Secretary of the Navy, Washington, D.C.

[21] Appl. No.: 573,769

[22] Filed: Aug. 28, 1990

[51] Int. Cl.⁵ .................................... B63H 1/26
[52] U.S. Cl. .................... 416/230; 416/241 R; 416/241 A; 416/229 R; 416/500; 416/224
[58] Field of Search .......... 416/230 A, 230 R, 241 A, 416/241 R, 232, 224, 229 R, 500; 416/232, 224, 229 R, 500

[56] References Cited

U.S. PATENT DOCUMENTS

| | | | |
|---|---|---|---|
| 1,658,460 | 2/1928 | Nichols | 416/232 |
| 1,775,395 | 9/1930 | Hiorth . | |
| 2,631,678 | 3/1953 | Enos | 416/232 |
| 2,823,895 | 2/1958 | Floroff | 416/500 X |
| 3,000,446 | 9/1961 | Warnken | 416/230 A |
| 3,318,388 | 5/1967 | Bihlmitr | 416/229 X |
| 3,426,804 | 2/1969 | Bluck | 139/11 |
| 3,528,382 | 9/1970 | Clark et al. | 114/162 |
| 3,883,267 | 5/1975 | Baudier et al. | 416/230 |
| 3,999,888 | 12/1976 | Zincone | 416/230 A X |
| 4,097,193 | 6/1978 | Brunsch et al. | 416/224 |
| 4,156,583 | 5/1979 | Mayertak | 416/230 A X |
| 4,188,171 | 2/1980 | Baskin | 416/500 X |
| 4,268,571 | 5/1981 | McCarthy | 416/230 X |
| 4,306,839 | 12/1981 | Pien | 416/200 R |
| 4,381,960 | 5/1983 | Pinter et al. | 416/230 X |
| 4,483,214 | 11/1984 | Mayer | 74/572 |
| 4,639,284 | 1/1987 | Mouille et al. | 416/230 X |
| 4,797,066 | 1/1989 | Stromberg | 416/230 |
| 4,875,829 | 10/1989 | Van Der Woude | 416/241 A X |
| 4,966,527 | 10/1990 | Merz | 416/230 X |

FOREIGN PATENT DOCUMENTS

| | | | |
|---|---|---|---|
| 0121462 | 10/1984 | European Pat. Off. | 416/230 |
| 3420259 | 12/1985 | Fed. Rep. of Germany | 416/229 R |
| 505912 | 8/1920 | France | 416/224 |
| 195916 | 7/1967 | U.S.S.R. | 416/229 |
| 521402 | 1/1977 | U.S.S.R. | 416/230 |

OTHER PUBLICATIONS

The Random House College Dictionary, Revised Edition, 1980, pp. 502-503.
Rubber For Propellers, United Aircraft Corporation, p. 29, 1950.

Primary Examiner—Edward K. Look
Assistant Examiner—Todd Mattingly
Attorney, Agent, or Firm—Luther Marsh; Gary G. Borda

[57] ABSTRACT

A rotor and a method for the production thereof which incorporates the inherently strong, highly damped, yet light weight characteristics of fiber reinforced plastic composites, Achieving with a minimal amount of added weight in the form of high density material a significant reduction in the vibratory response of the rotor due to hydrodynamic flow excitation, by selectively tailoring the mass distribution therein as by adding the high density material at selected locations of the rotor.

11 Claims, 4 Drawing Sheets

MASS LOADED COMPOSITE ROTOR FOR VIBRO-ACOUSTIC APPLICATION

The invention described herein may be manufactured and used by or for the Government of the United States of America for government purposes without the payment of any royalties thereon or therefor.

BACKGROUND OF THE INVENTION

1. Field of the Invention

The present invention relates to rotors and more specifically to the incorporating therein of inherently strong, highly damped, yet light weight characteristics of fiber reinforced plastic (FPR) composite material for vibro-acoustic applications.

2. Description of the Prior Art

Fiber reinforced plastic composites have both performance and fabrication characteristics which are beneficial to all generically related rotor applications in both air and water flow. When used in the fabrication of rotors, relatively low density composite materials reduce overall weight and inertial loading. Superior vibration damping performance is desirable in order to reduce noise and fatigue due to vibration in rotor applications. The prior art shows that highly damped composites are feasible and effective as materials of construction for marine propulsors and other rotor applications. However, the low density of composites accentuates the low structural impedance in the tip region of rotor blades so that the rotors are easily excited. This offsets the potential advantage of high damping, since minimizing the vibration response of a rotor to flow excitation requires high values for both material density and mechanical damping. Nevertheless, the desirable quality of low composite material density in terms of weight saving may be maintained, and the acoustically detrimental quality thereof may be reduced, by an appropriate tailoring of mass distribution in a rotor via localization of the high density material in the tip region.

U.S. Pat. No. 4,097,193 illustrates an elastomeric damping arrangement for damping vibrations of a structural member, such as a vibration prone airfoil, particularly a helicopter rotor blade tending to vibrate under dynamic deformations.

U.S. Pat. No. 4,797,066 illustrates a propeller blade at an increased service load automatically optimizes its pitch, thus reducing or preventing cavitation wherein flexibility is obtained for the propeller utilizing plastic materials have anisotropic properties, i.e. from materials with different physical characteristics in different directions.

SUMMARY OF THE INVENTION

Accordingly the invention provides a high damping light weight mass loaded composite rotor comprising a hub portion having an axis and adapted for rotating about the axis; a plurality of blades extending from the hub portion, each blade having a composite portion being made of a multidimensionally braided multiple fiber reinforcement, said multiple fibers of said reinforcement being separated by and totally encompassing a rubber material insert, and a high density material portion wherein the high density material is utilized and located in localized, high vibration active regions of the blade; and wherein a matrix resin is utilized to rigidly bind the multidimensionally braided multiple fiber reinforcement, the rubber material insert and the high density material.

OBJECTS OF THE INVENTION

A primary object of the invention is to provide a rotor that is inherently strong, highly damped yet has lightweight characteristics of fiber reinforced plastic composite material and with specific tailoring of the mass distribution within the rotor for reducing vibratory response.

Another object of the invention is to provide a rotor of significant weight reduction.

A further object of the invention is to provide an impact tolerance of great significance.

A still further object of the invention is to provide improved erosion resistance.

Other objects, features and advantages of the invention will be readily apparent from the following detailed description of certain embodiments illustrating the invention.

BRIEF DESCRIPTION OF THE DRAWINGS

The accompanying drawings illustrate some embodiments of the invention.

DETAILED DESCRIPTION OF THE INVENTION

The present invention provides a rotor which incorporates the inherently strong, highly damped, yet light weight characteristics of fiber reinforced plastic composites. A significant reduction of the vibratory response of the rotor due to hydrodynamic flow excitation is achieved, with a minimal amount of added weight, by selectively tailoring the mass distribution therein. To this end, a high density material is added at high vibration active regions of the rotor.

Figure 1:
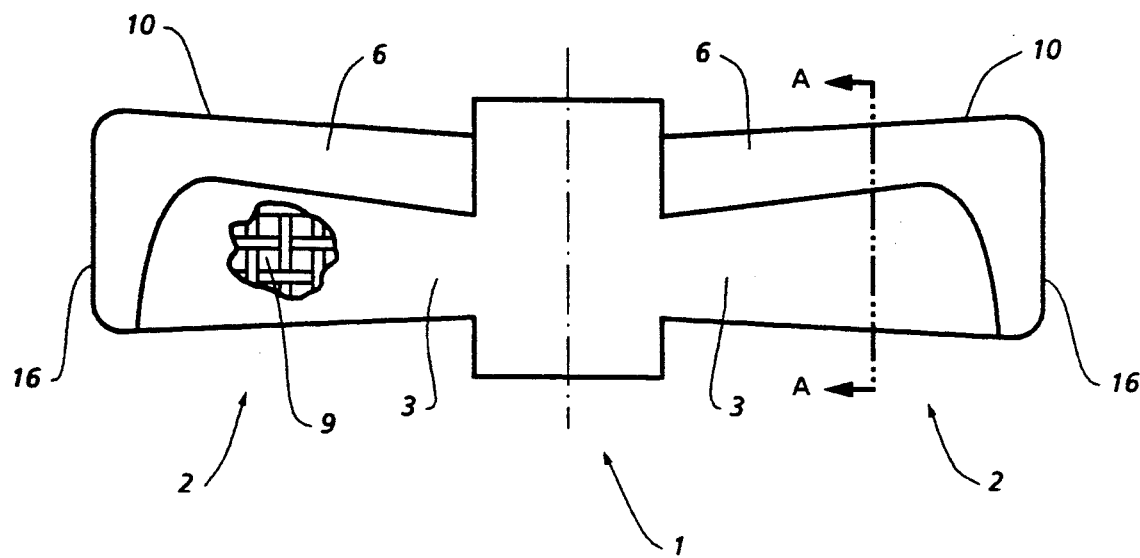
FIG. 1 shows in a frontal elevational view and partially in section a propeller in accordance with the invention.
Figure 2:
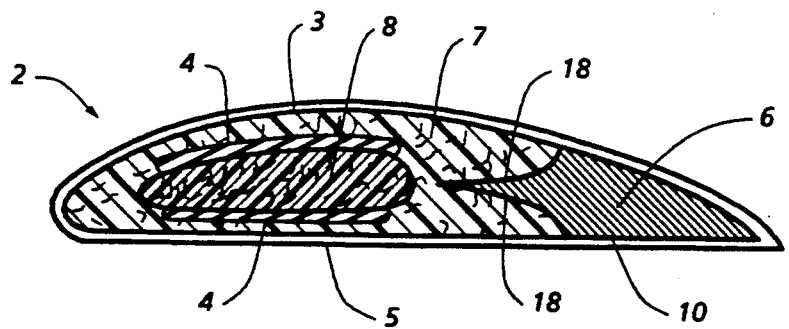
FIG. 2 is a section along line A—A of FIG. 1.
Figure 3:
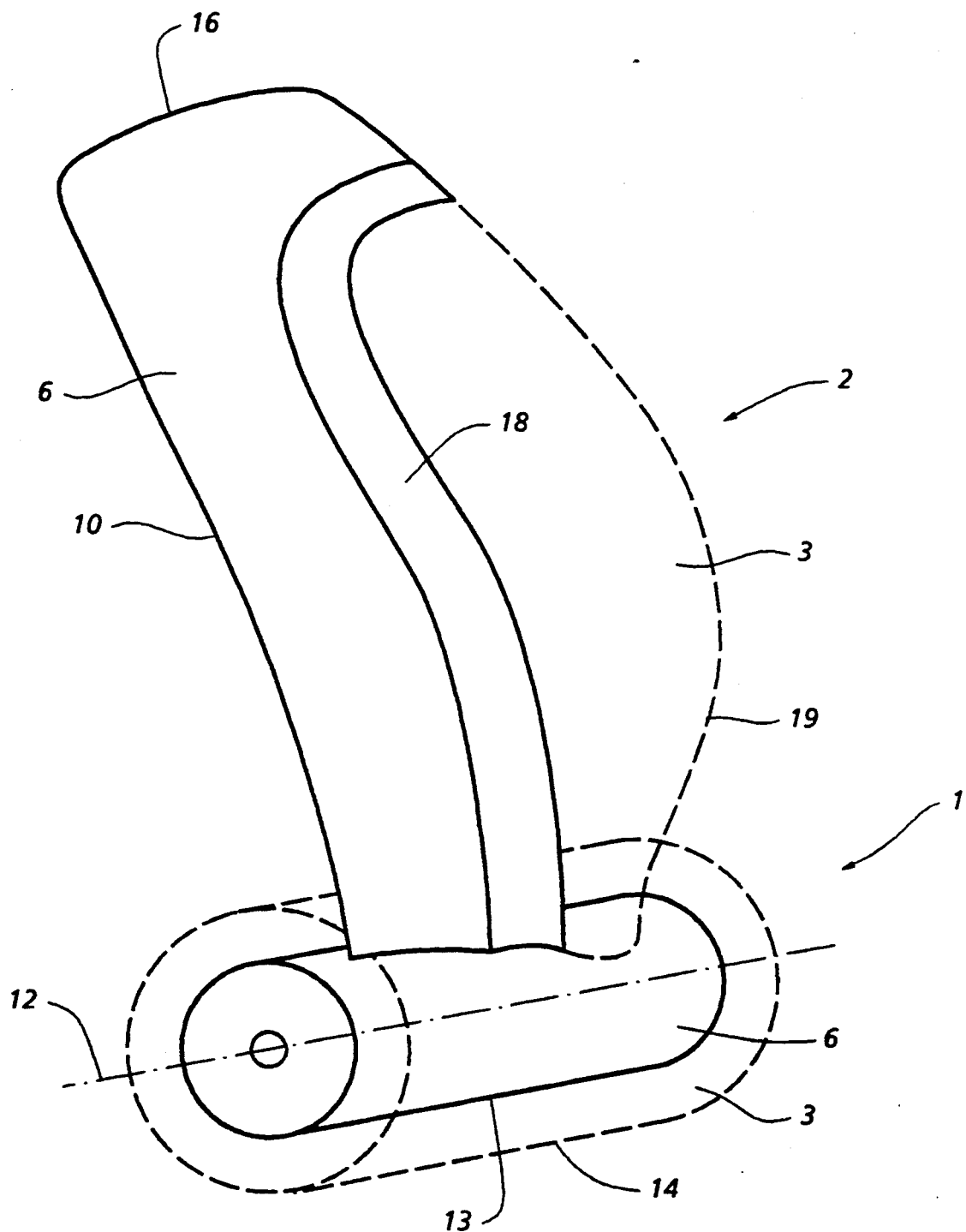
FIG. 3 shows a perspective view of a rotor blade and hub in accordance with the invention.

In the embodiment as in FIG. 1 the present invention has been reduced to test hardware and its effectiveness has been evaluated. As shown in FIG. 1, the rotor has a hub portion 1 and two rotor blades 2 extending therefrom. The composite material is a multidimensionally braided multiple fiber reinforcement 3 made of graphite and Kevlar 8, as shown in FIG. 2. A flat rubber insert 4 separates both types of fiber of the multidimensionally braided multiple fiber reinforcement 3, as shown in FIG. 2. The volume fraction of each type of fiber of the multidimensionally braided multiple fiber reinforcement 3, and flat rubber insert 4 in FIG. 2 is in accordance with desired damping, structural strength, and stiffness requirements. A portion of the blades and hub is high density material 6, as shown in FIG. 1; high density material 6, as shown in FIG. 2; and high density material 6, as shown in FIG. 3. As shown in FIGS. 2 and 3, trailing edge spar 10 made of high density material 6 is fastened by means of a scarf joint arrangement to multidimensionally braided multiple fiber reinforcement 3. In this embodiment, the multidimensionally braided composite portion of the rotor blade is designed to "glove fit" the scarfed surface 18 formed on trailing edge spar 10. A thermosetting epoxy resin binds and rigidizes the graphite and Kevlar fiber reinforcements to each other as well as the rubber insert and high density material interfaces. For hydraulic applications, the composite rotor or a part thereof can be coated with a compliant material coating 5, as in FIG. 2, such as polyurethane, for reducing erosion of the rotor due to cavitation.

Figure 6:
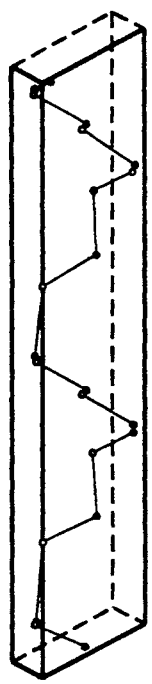
FIG. 6 is a diagram of a representative travel path of an individual fiber in accordance with the invention.
Figure 7:
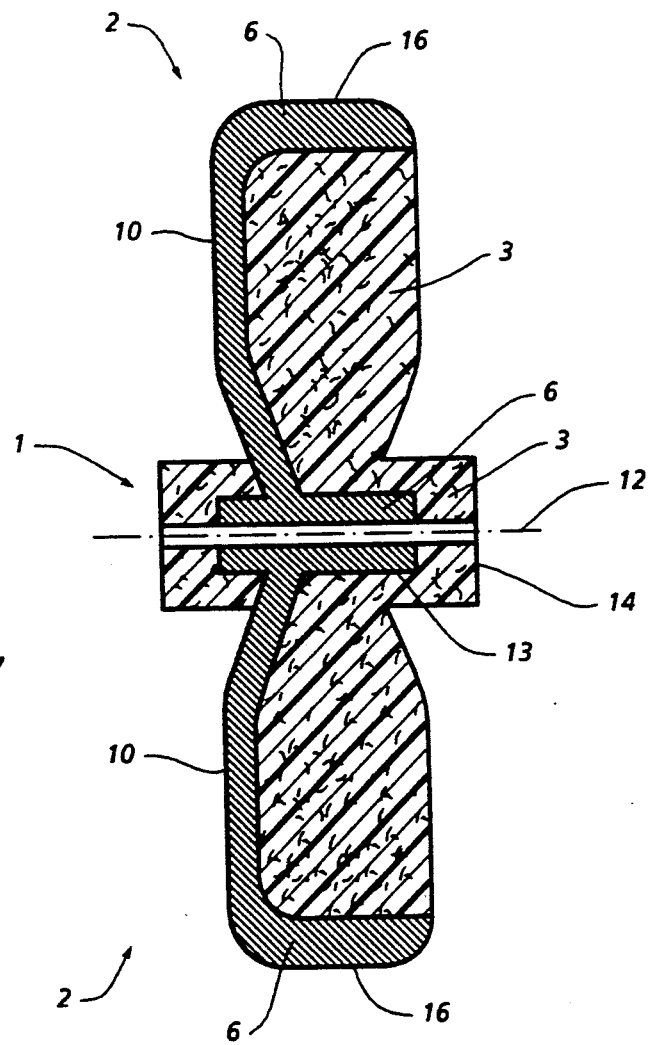
FIG. 7 is a sectional view of a propeller in accordance with the invention showing the hub encompassed with the multidimensionally braided multiple fiber reinforcement.

The multidimensionally braided multiple fiber reinforcement is characterized as having a skeletal fiber construction with individual fiber yarns interacting in a through-the-thickness "helical" -type path, said construction being uniquely appropriate for the rotor application for reasons of damage tolerance. FIG. 6 is a diagram of a representative travel path of an individual fiber through a prismatic element of the multidimensionally braided fiber reinforcement of the invention. This through-the-thickness reinforcement has the advantage of lacing planes of delamination which are characteristics of conventional laminated, ply-on-ply composites, and which would be unreliable in the rotor application because of low damage resistance. The multidimensionally braided fibers are generally illustrated in FIG. 2 by item 9 which is a magnified view of a portion of the multidimensionally braided multiple fiber reinforcement 3 of blade 2. A general explanation of the known art of multidimensionally braided fibers can be found in David Taylor Naval Ship Research and Development Center report number DTNSRDC/SME-84-66, published in October 1984, entitled "The Fabrication, Processing and Characterization of Multidimensionally Braided Graphite/Epoxy Composite Materials," By Aleksander Macander, Roger Crane and Eugene Camponeschi Jr.

As shown in FIG. 3, high density material 6, is a fractional portion of rotor blade 2 and hub 1. In this configuration the high density material 6 provides a trailing edge spar 10 that is contiguous with a rotor blade tip 16 which is also made of high density material 6 and which acts as the mass load at the outer radial location of the rotor. Although not shown, an alterative design could eliminate trailing edge spar 10 and maintain the mass at rotor blade tip 16, thereby gaining additional weight savings in the rotor. Here hub 1, which is rotatable about a shaft 12, has an inner region 13 made of high density material 6 and an outer annular region 14 made of multidimensionally multiple fiber reinforcement 3. Alteratively hub 1 can be made entirely of high density material 6 such as bronze material or of multidimensionally braided fiber reinforcement 3 or in combination thereof in different locations, as, for example, wherein inner region 13 is made of multidimensionally braided fiber reinforcement 3 and outer annual region 14 is made of high density material 6 such as bronze material. As shown in FIG. 3, trailing edge spar 10 has a scarfed joint surface 18 that will accept a portion of multidimensionally braided fiber reinforcement 3 in missing composite region 19 so as to mater the high density material 6 with the multidimensionally braided fiber reinforcement 3.

Figure 4:
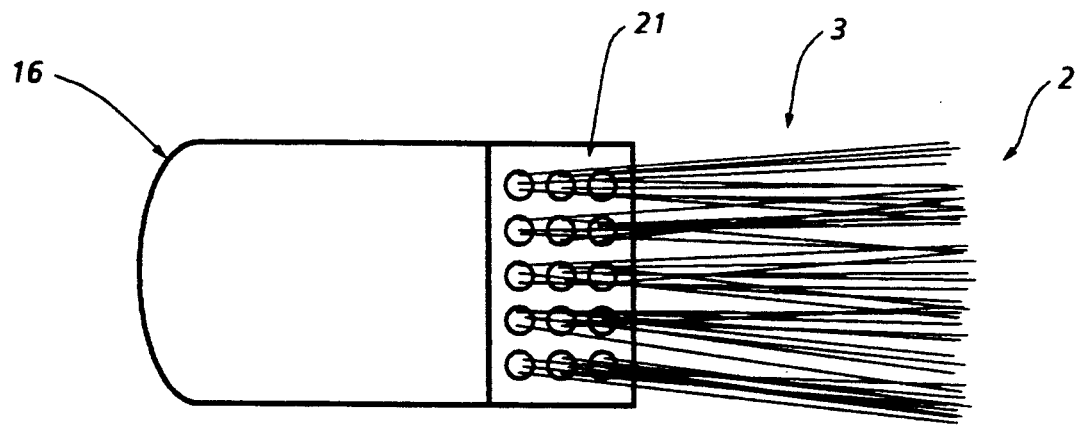
FIG. 4 shows a top view of a rotor blade and the attachment by looping the fibers of the composite materials through holes in the metal tip.
Figure 5:
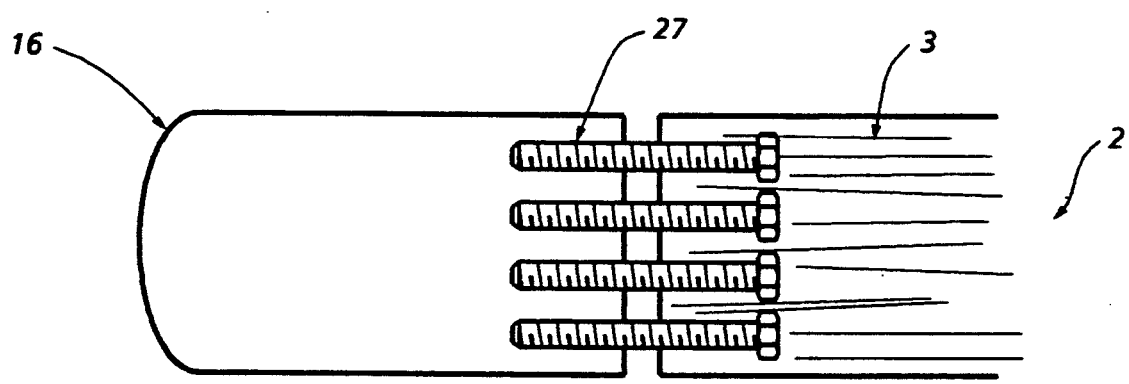
FIG. 5 shows a side view of a rotor blade and the attachment of the composite materials by mechanical means.

FIG. 4 and 5 show alternative means by which a high density material portion can be fastened appropriately to a rotor blade in such a way as to become an integral part of the blade. As shown in FIG. 4, rotor blade tip 16 made of high density material has holes 21 for enabling the looping therethrough of multidimensionally braided fibers 3 in rotor blade 2. In FIG. 5 rotor blade tip 16 made of high density material is fastened by hooking means to multidimensionally braided fiber 3 in rotor blade 2, as, for example, by means of screw in threaded hinged hook 27 for securing multidimensionally braided fibers 3 to rotor blade tip 16.

In the examples given in FIG. 4 and FIG. 5 the high density material is preferably in the form of a solid. The solid high density material portion of the rotor, for example, solid metal, can be replaced by high density material filaments, for example, metallic filaments, which can be integrally braided or woven to form the high density material region of the rotor. When in the form of integrally braided metallic filaments, the high density material can be appropriately fastened to the rotor blade by intertwining the fibers of the multidimensionally braided fiber reinforcement with the fibers of the high density material.

In the present invention the rotor can have any number of blades. The multidimensionally braided fiber reinforcement need not be made of graphite and Kevlar as in above examples, but can be made of either graphite or Kevlar or of another material or other materials in combination with each other or with graphite or Kevlar or both. The rubber material need not be in the form of a flat rubber insert 4 as in FIG. 2 but can be in any form, or can be omitted altogether. The high density material can be selected from among a group including, but not limited to, bronze, lead, steel and tungsten, or can even be made of a combination of two or more high density materials selected from among said group and/or from outside said group, especially if the high density material is in the form of integrally braided high density material filaments. The matrix resin can be selected from among a group of resins which includes, but is not limited to, epoxy resin, thermosetting epoxy resin, and low viscosity resin.

As for the location of the high density material in the rotor, the high density material is not necessarily located at the tip of the blade and/or at the trailing edge of the blade in the form of a spar, as in above examples, but in any case is utilized and located in localized, highly vibration active regions of the blade, as in outer radial regions of the rotor.

For hydraulic applications a composite rotor would have to endure erosion due to cavitation. The composite rotor or a part thereof can be coated with a compliant material 5, as in FIG. 2, such as polyurethane, for reducing erosion of the rotor due to cavitation. It is noted that adherence of the compliant material coating would not be a problem with a composite rotor as it would be with a metallic rotor, as compliant material coatings such as polyurethane coatings come off metallic rotor surfaces due to fouling or rusting.

An embodiment of the present invention which was reduced to test hardware was fabricated by using an existing, configuratively compete, two-foot diameter, two-blade rotor as a master to create a two-cavity matched mold for use in the impregnation and molding phases of the fabrication process. The present invention has no dimensional limitation, and the mold can comprise any number of cavities. The mold was made from a laminated graphite/epoxy composite; however, can be made from any material having adequate dimensional stability. A reduced section bronze rotor as shown in FIG. 3 was machined to conform to the mold at the hub portion and blade trailing edges and tips. A multidimensionally braided composite skeletal construction was designed to "glove fit" so as to mate with the reduced section bronze rotor and provide the missing geometry in missing composite region 19. Here both the blade tip 16 and trailing edge spar 10 were made of high density material 6, namely, bronze material, alternatively, the composite rotor can be made of high density material and multidimensionally braided fiber reinforcement in any locational combination, as, for example, wherein only the blade tip 16 is made of high density material such as bronze material. Fabrication of the skeletal glove or sock made of multidimensionally braided multiple fiber reinforcement involves a through-the-thickness preconceived entanglement of individual yarns to form the desired net shape geometry. All bronze surfaces of the reduced section bronze rotor were prepared and primed in order to effectuate a sufficiently strong bondline to the braided preform. The braided preform was mated with the reduced section bronze rotor to together form a braided preform/bronze hybrid structure which conform to the shape of the mold. The braided preform/bronze hybrid structure was placed into the mold. The mold was sealed and placed under vacuum in order to remove air form the braided preform portion of the braided preform/bronze hybrid structure inside the mold. Low viscosity resin was injected under 100 psi pressure to replace air, and the structure was cured in the closed mold on application of a suitable temperature cure cycle. Resin injection or transfer also could have been done under vacuum only. The rotor structure was removed from the mold when ready, and deflashed.

The present invention can be fabricated having two or more than two rotor blades. Any high density material, including, inter alia, lead, steel, and tungsten, can be substituted for the bronze material, and the high density material can be in the form of a solid or of integrally braided metallic filaments. The high density material portion can be mated with the multidimensionally braided fiber reinforcement portion by means other than afore described, as, for example, by looping the multidimensionally braided fibers through holes in the high density material, as in FIG. 4, or hooking the high density material to the multidimensionally braided fibers, as in FIG. 5, or otherwise intertwining the multidimensionally braided fibers with the high density material. In the afore described fabrication example the high density material was located in the blade tip and tailing edge spar, but any locational combination of high density and multidimensionally braided fiber materials can be suitable for the fabrication process. Additionally, a rubber material portion, such as a rubber insert or "insole,", can be fabricated so as to mate with the portions made of high density material and multidimensionally braided multiple fiber reinforcement and in such a way as together form a braided preform/rubber material/high density material structure which conforms to the shape of the mold. The low viscosity resin which was used for impregnating at least part of the mold can be any matrix resin such as an epoxy resin or a thermosetting epoxy resin, and can be injected or otherwise impregnated under a pressure amount greater than, less than, or equal to 100 psi pressure. Any of the steps of preparing and priming the high density material surface for effectuating a sufficiently strong bondline to the portion made of multidimensionally braided fiber reinforcement, or curing the matrix resin in the mold, or deflasing the rotor after removing it from the mold, may not be necessary or appropriate in accordance with the present invention.

Obviously many modifications and variations of this invention are possible in light of the above teachings. While this invention has been shown and described with two sets of propeller blades attached to the hub, it is conceivable that the other sets of blades could be employed. It is therefore to be understood that within the scope of the following claims the invention may be practiced otherwise than as specifically described.

What is claimed is:

1. A high damping light weight mass loaded composite rotor comprising:
   a. a hub having an axis and adapted for rotation about the axis;
   b. at least one blade extending from said hub, said blade having a composite portion being made of a multidimensionally braided multiple fiber reinforcement wherein the individual fiber yarns of said multidimensionally braided multiple fiber reinforcement interact in a through-the-thickness helical type entanglement of individual fiber yarns to form a multidimensionally braided composite skeletal shape such that said multidimensionally braided multiple fiber reinforcement lacks planes of delamination, a rubber material insert portion totally encompassed by said multidimensionally braided multiple fiber reinforcement, and a high density material portion wherein said high density material is utilized and located in localized high vibration active regions of said blade; and
   c. a matrix resin to impregnate said multidimensionally braided multiple fiber reinforcement and to rigidly bind the multidimensionally braided multiple fiber reinforcement, the rubber material insert and the high density material, whereby the mass distribution with the high damping lightweight mass loaded composite rotor is tailored to reduce vibratory response of said blade to flow excitation.

2. A high damping light weight mass loaded composite rotor as in claim 1 wherein said multidimensionally braided multiple fiber reinforcement comprises a first composite fiber region and a second composite fiber region wherein the individual fiber yarns of said first composite fiber region are graphite and the individual fiber yarns of said second composite fiber region are Kevlar.

3. A high damping light weight mass loaded composite rotor as in claim 1 wherein the rubber material insert portion is a flat rubber insole and made from material selected from the group consisting of neoprene, nitrile rubber and natural rubber.

4. A high damping light weight mass loaded composite rotor as in claim 1 wherein said high density material is selected from the group consisting of bronze, lead, steel and tungsten and further wherein said high density material is of a sufficient mass to effectively damp flow induced vibration.

5. A high damping light weight mass loaded composite rotor as in claim 1 wherein the matrix resin is a thermosetting epoxy resin.

6. A high damping light weight mass loaded composite rotor as in claim 1 wherein said hub portion is comprised of an inner region of high density material and an other annular region of multidimensionally braided multiple fiber reinforcement encompassing said high density material inner region.

7. A high damping light weight mass loaded composite rotor as in claim 1 wherein said high density material is utilized and located at the tip of said blade and further wherein said high density material is of a sufficient mass to effectively damp flow induced vibration.

8. A high damping light weight mass loaded composite rotor as in claim 1 wherein the high density material is in the form of a solid.

9. A high damping light weight mass loaded composite rotor as in claim 1 wherein the surface of the rotor is coated with a compliant material for reducing erosion of the rotor due to cavitation.

10. A high damping light weight mass loaded composite rotor as in claim 1 wherein said high density material portion of said blade comprises a trailing edge spar and a tip portion contiguous with said trailing edge spar and further wherein said high density material is of a sufficient mass to effectively damp flow induced vibration.

11. A high damping light weight mass loaded composite rotor as in claim 1 wherein said high density material portion of said blade comprises integrally braided high density material filaments.

* * * * *